(No Model.) 2 Sheets—Sheet 1.
F. B. JACOBUS & W. V. McKINLEY.
PARLOR BASE BALL GAME.
No. 330,788. Patented Nov. 17, 1885.
Fig. 1.
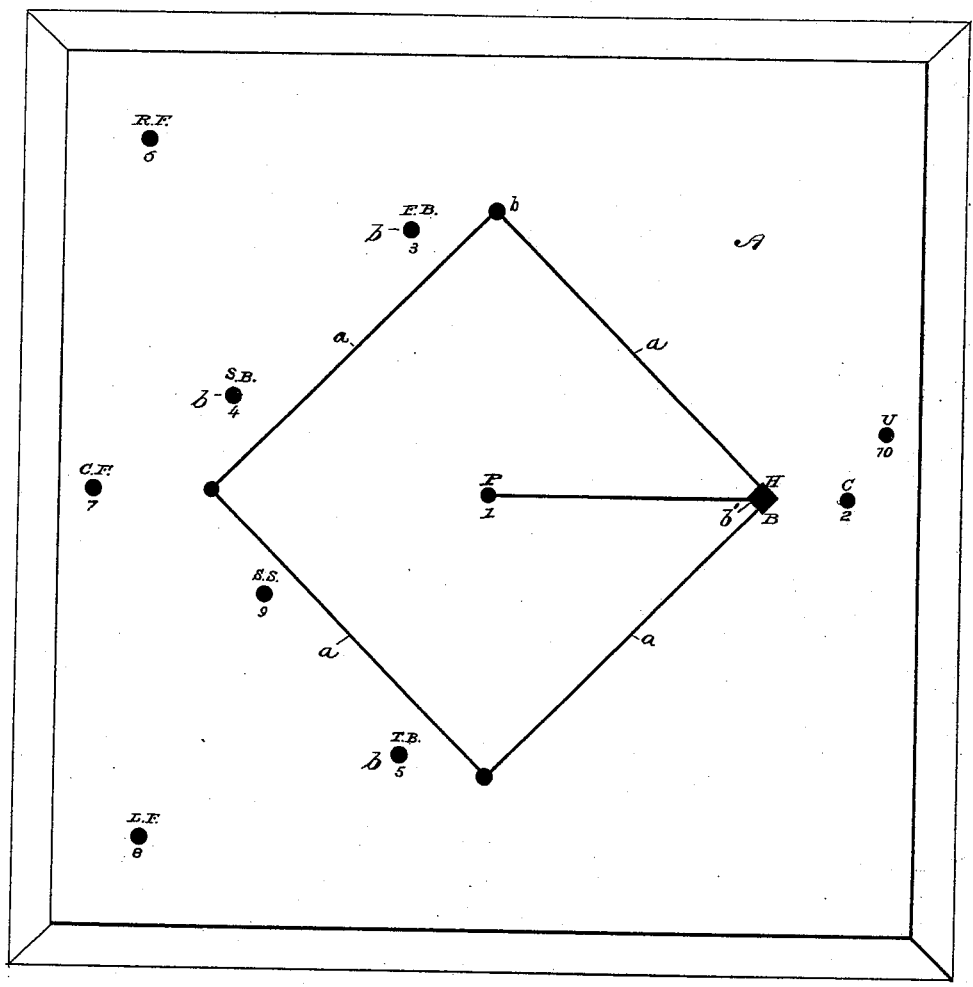
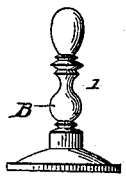
Fig. 3.
WITNESSES
INVENTORS
Francis B. Jacobus
W. V. McKinley
by C. A. Snow & Co.
Attorneys (No Model.) 2 Sheets—Sheet 2.
F. B. JACOBUS & W. V. McKINLEY.
PARLOR BASE BALL GAME.
No. 330,788. Patented Nov. 17, 1885.
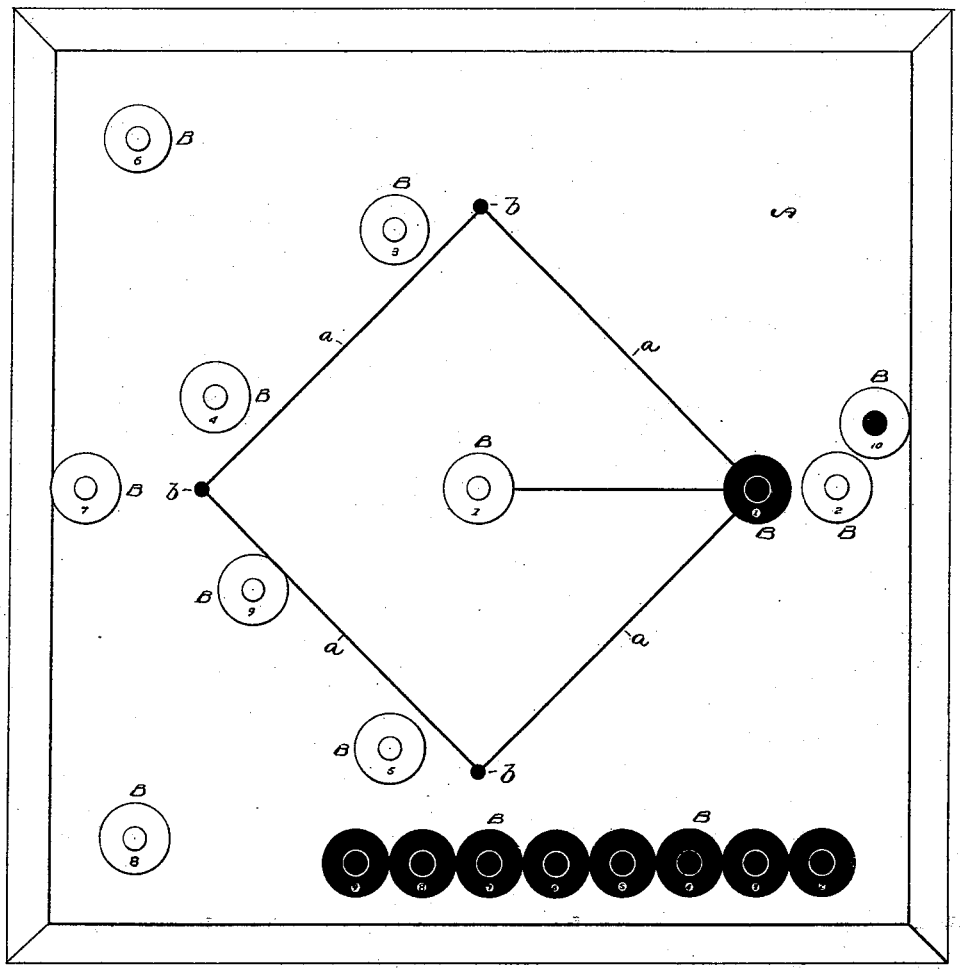
FIG. 2.
FIG. 4
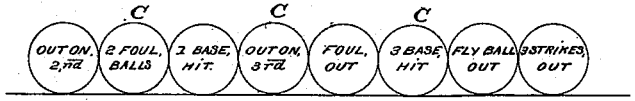
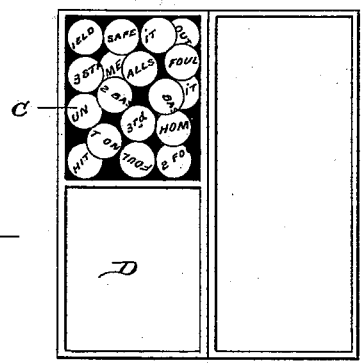
WITNESSES
INVENTORS
Francis B. Jacobus
Wm. V. McKinley
by C. A. Snow & Co.
Attorney

UNITED STATES PATENT OFFICE.

FRANCIS BENJAMIN JACOBUS AND WILLIAM VINCENT McKINLEY, OF ALBANY, NEW YORK.

PARLOR BASE-BALL GAME.

SPECIFICATION forming part of Letters Patent No. 330,788, dated November 17, 1885.

Application filed September 25, 1885. Serial No. 178,172. (No model.)

*To all whom it may concern:*

Be it known that we, FRANCIS B. JACOBUS and WILLIAM V. MCKINLEY, citizens of the United States, residing at Albany, in the county of Albany and State of New York, have invented a new and useful Improvement in Parlor Base-Ball Games, of which the following is a specification, reference being had to the accompanying drawings.

Our invention relates to improvements in parlor base-ball-game apparatus; and it consists in the provision of a game-board the face of which is arranged to represent a base-ball field—*i. e.*, having a diamond-shaped diagram thereon and indicating-marks and figures to denote the various bases and the positions of the players, a series of figures to represent the players, and a number of balls or other devices to be withdrawn from a box or other receptacle by the person or persons who play the game, said balls having a character or words thereon indicating the fate of the latter, all as will be hereinafter fully set forth, and specifically pointed out in the claims.

In the accompanying drawings, which form a part of this specification, Figure 1 is a plan view of the game-board, showing the diamond-shaped diagram and the marks or characters and numerals indicating the position of the players. Fig. 2 is a similar view with the players or pieces in their proper relative positions thereon for playing the game, the receptacle for the balls being shown at one side. Fig. 3 is a detail view of one of the pieces employed to represent the players, and Fig. 4 is a view of a number of balls or spheres having the words thereon which denote the fate of or the action performed by the players at the bat.

Like letters of reference denote corresponding parts in the several figures of the accompanying drawings, referring to which—

A designates the game-board; B, the movable pieces or players; and C, the balls or spheres denoting the fate of the players, to be withdrawn by the person or persons who play the game from the receptacle or box D.

The game-board A is made of any suitable material and of any preferable size and shape, preferably square, and is provided with a diamond shaped diagram formed by the oblique line $a$, to represent a ball-field. At each angle or corner of the diagram is provided a base, the first, second, and third bases being designated by a round dot or mark, as at $b$, and the home-base by a diamond-shaped figure and the letters "H B," as at $b'$.

The positions of the various players, the outfielders, infielders, and catcher, are arranged on the board in proper juxtaposition to the various angles of the diamond-shaped diagram in the following manner, to wit: Behind the home-plate "H B" is a mark or character and the letter "C," to denote the catcher's position; in front of the home-plate the pitcher's position, denoted by a character and the letter "P;" near each dot of the various bases a character and the letters to denote the basemen, the first base having the letters "F B," the second base the letters "S B," and the third base the letters "T B;" the right, left, and center fielders exteriorly to the diagram at proper distance and position therefrom, and having the indicating-character and the letters "R F," "C F," and "L F," respectively, and the player denoted the "short-stop" is arranged between the second and third bases, and having the indicating-character and letters "S S." These characters and letters are also numbered, beginning with the pitcher, numbered 1; the catcher, 2; the first, second, and third basemen, 3, 4, and 5; the various outfielders, right, center, and left, 6, 7, and 8, respectively, and the short-stop 9, as clearly shown in Fig. 1. An umpire is arranged near to the catcher "$C^2$," and is denoted by the letter "U" and the numeral 10.

There are two sets of men B employed, nine in each set, to represent the nine players of each club, and each set or nine is of different colors, to distinguish one set from the other, and another piece or figure is employed to designate the umpire. Thus there are nineteen players or pieces, nine pieces for each set and one for the umpire. Each set of players is numbered from 1 to 9, to denote the various positions of the pieces on the board, and the piece denoting the umpire is made of two colors, to distinguish it from the sets of players, and is numbered 10.

Each of the balls or spheres is marked or provided with words to denote the action performed by the runner or batter, and said balls or spheres are preferably twenty-four in number, to correspond to the various plays, which are divided into two classes, those denoting the fact that the batter is entitled to one or more bases, and those that denote an "out."

Among the first-named class are the following: first-base hit, second-base hit, third-base hit, home run, called balls, three striker safe, fly ball safe, foul, not out, balk, fair hit, safe, and two foul balls; and among the latter class are three strikes out, fly ball out, foul out, hindering catcher, fielded out, struck by fair hit, out of place, out on first, out on second, out on third, and out on home. These various plays may be changed, omitted, or additions made thereto, and other devices in lieu of balls or spheres may be employed without departing from the principle or sacrificing the advantages of our invention.

To illustrate the operation, the following is appended: The pieces representing the players of one nine or club are placed on the dot or character denoted by the number, the pieces of the other club being arranged in the order of their numbers on one edge of the board, and the umpire placed in position, a score-card being provided for keeping the record or plays made by the players of the club. Two or more persons may play the game, or it may be played by one person only. The figure 1 of the club arranged on the edge of the board, which we will designate for convenience as the "in" club and the other the "out" club, is placed on the home-plate, and one of the persons whose side or nine is in draws a ball or sphere from the box, and the words therein denote whether the player is put out or makes one or more bases—as, for example, if the ball containing the words "two-base hit" is drawn, the batter, Fig. 1, is advanced to the second base, another figure or player takes his place from among the in club, the figure marked 2, and another ball is drawn by the same player, which will determine his fate. This is continued until three players are put out, the record of runs and various plays being kept on the score-card in the meanwhile, when the out side comes in and the in club or side retires, the game being thus continued until the nine innings are played. The person who makes the highest number of scores or runs is entitled to or wins the game; and when at the end of the ninth inning the score of both persons are even or "tie" the game is continued until the deciding run or score is secured by one of the persons who play the game. At the conclusion of each inning after the first inning the player following the last player at the bat comes first to the bat, as is usual.

Additional interest may be given to the game by having each set of figures of one color represent the favorable club of the person who plays the game, means being provided for keeping the score accurately.

It will be observed from the foregoing description, taken in connection with the drawings, that we provide a very interesting and amusing parlor base-ball-game apparatus— one that is simple in its construction, easy of operation, and which can be manufactured and sold at a minimum cost.

In order to define the nature and scope of our invention, we would state that heretofore it has been proposed to provide a game apparatus comprising a base-board having a diamond-shaped diagram, a series of spaces at each end of the board to indicate the innings, wires arranged in juxtaposition to the inning-spaces and provided with a number of rings arranged to slide thereon, and two dice having numerals and ciphers, which dice are cast by the person who plays the game, and thus determines the fate of the players.

We are also aware that it is not new to provide a base-ball-game apparatus consisting of a number of variously-colored sets of squares arranged to represent a base-ball diamond and the various field positions, a portion of said squares being provided with numbers and characters, and an indicator having a circle of the various colors employed on the board, and another circle consisting of a number of blocks or spaces, each block or space being provided with a number of different colors, and two pointers on the indicator, arranged to be turned on a central pivot to designate a certain color and number.

Our invention differs from these devices in the fact that we employ a number of figures to represent the players which are moved to the various positions on the game-board and the diagram thereon, and a number of balls or spheres to be drawn from a receptacle, and each ball having a character or word or words to denote the fate of the player.

Our invention is simpler than either of the foregoing devices, can be learned and played with greater ease and facility, avoids the confusion and liability to errors incident upon casting of the dice or turning of the indicator-hands, besides rendering the game more interesting to the persons who play the game from the fact that any desired number of balls may be employed to denote all the various plays or actions which take place in the actual game contested by two nines or clubs in the field.

Having thus fully described our invention, what we claim as new, and desire to secure by Letters Patent, is—

A base-ball-game apparatus comprising a game-board having a diamond-shaped diagram thereon and indicating-characters at proper points to denote the positions of the various players, two sets of figures of different colors, and a number of balls or spheres to be withdrawn from a receptacle, and having words or characters which decide the fate of the player, as set forth.

In testimony that we claim the foregoing as our own we have hereto affixed our signatures in presence of two witnesses.

FRANCIS BENJAMIN JACOBUS.
WM. VINCENT McKINLEY.

Witnesses:
J. H. DEVINE,
F. DEVINE.